(12) United States Patent
Patz et al.

(10) Patent No.: US 11,984,692 B2
(45) Date of Patent: May 14, 2024

(54) ELECTRICAL JUNCTION BOX

(71) Applicant: APTIV TECHNOLOGIES LIMITED, St. Michael (BB)

(72) Inventors: Olaf Patz, Wohltorf (DE); Pawel Olek, Czechowice-Dziedzice (PL); Piotr Momot, Spytkowice (PL); Wojciech Lesniak, Cracow (PL)

(73) Assignee: Aptiv Technologies (2) S.à r.l., Luxembourg (LU)

( * ) Notice: Subject to any disclaimer, the term of this patent is extended or adjusted under 35 U.S.C. 154(b) by 53 days.

(21) Appl. No.: 17/949,572

(22) Filed: Sep. 21, 2022

(65) Prior Publication Data

US 2023/0020859 A1     Jan. 19, 2023

Related U.S. Application Data

(62) Division of application No. 17/103,237, filed on Nov. 24, 2020, now Pat. No. 11,489,304.

(30) Foreign Application Priority Data

Nov. 26, 2019   (EP) .................................... 19211424

(51) Int. Cl.
| | | |
|---|---|---|
| *H01R 43/00* | (2006.01) | |
| *H01R 4/04* | (2006.01) | |
| *H01R 4/28* | (2006.01) | |
| *H01R 43/28* | (2006.01) | |
| *H02G 15/013* | (2006.01) | |
| *H02G 15/113* | (2006.01) | |
| *H02G 15/117* | (2006.01) | |

(52) U.S. Cl.
CPC ............. *H01R 43/005* (2013.01); *H01R 4/04* (2013.01); *H01R 4/28* (2013.01); *H01R 43/28* (2013.01); *H02G 15/013* (2013.01); *H02G 15/113* (2013.01); *H02G 15/117* (2013.01)

(58) Field of Classification Search
CPC .................................................... H01R 43/005
USPC ............................................................ 174/50
See application file for complete search history.

(56) References Cited

U.S. PATENT DOCUMENTS

| | | | | |
|---|---|---|---|---|
| 5,844,171 | A * | 12/1998 | Fitzgerald | ............ H02G 15/113 174/92 |
| 9,660,434 | B2 * | 5/2017 | Kett | ...................... H02G 15/113 |
| 2015/0382516 | A1 * | 12/2015 | Steinberg | ............ H01R 13/6591 174/359 |
| 2016/0365676 | A1 | 12/2016 | Venaleck et al. | |
| 2019/0013595 | A1 * | 1/2019 | Iwata | ..................... H01R 4/188 |

FOREIGN PATENT DOCUMENTS

| | | |
|---|---|---|
| DE | 9303361.3 U1 | 4/1994 |
| DE | 102013011874 A1 | 1/2015 |
| EP | 3466768 A1 | 4/2019 |

OTHER PUBLICATIONS

European Search Report dated May 12, 2020; Application No. 19211424.7, 6 pages.

* cited by examiner

*Primary Examiner* — Stanley Tso
(74) *Attorney, Agent, or Firm* — Billion & Armitage

(57) ABSTRACT

An electrical junction box comprises an electrically conductive housing and at least one cable end wherein an everted braided shield section of the cable end is received in a retainer section of the housing and an electrically conductive adhesive is provided.

10 Claims, 1 Drawing Sheet

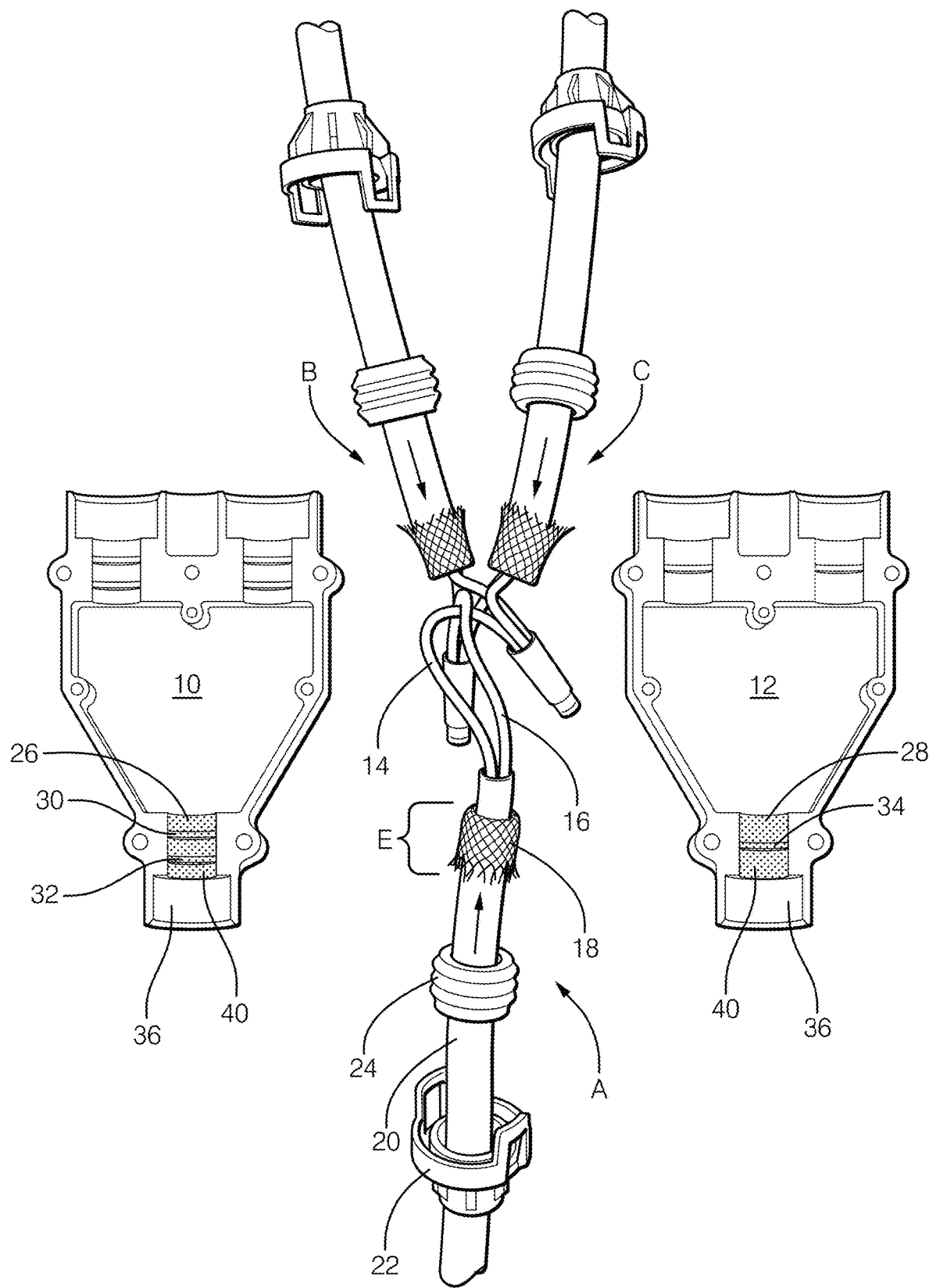

ELECTRICAL JUNCTION BOX

CROSS-REFERENCE TO RELATED APPLICATION

This application is a divisional application of U.S. patent application Ser. No. 17/103,237 filed Nov. 24, 2020 which claimed benefit of priority to European Patent Application No. 19211424.7 filed in the European Patent Office on Nov. 26, 2019, the entire disclosure of each of which is hereby incorporated by reference.

TECHNICAL FIELD OF THE INVENTION

The present disclosure relates to a method of manufacturing an electrical junction box and to an electrical junction box, in particular for electrical or hybrid vehicles.

An electrical junction box for accommodating one or more cable ends is generally known, in particular in the field of electrical or hybrid vehicles employing high voltage harnesses. Such high voltage harnesses need to be shielded to prevent electromagnetic radiation to escape that could disturb other components of vehicles or the environment.

There is a need to provide an electrical junction box and a method of manufacturing an electrical junction box which require less parts at reduced cost.

BRIEF SUMMARY OF THE INVENTION

The present disclosure provides a method of manufacturing an electrical junction box and an electrical junction box according to the independent claims. Embodiments are given in the subclaims, the description and the drawings.

In one aspect, the present disclosure is directed to a method of manufacturing an electrical junction box comprising a protective housing and at least one cable end defining an axial direction. The method may comprise the steps of providing a cable end, everting a braided shield of the cable to partially surround an isolating jacket of the cable end, thereby forming an everted braided shield section, providing an electrically conductive housing which has a retainer section for receiving an everted braided shield section of the cable end, said retainer section having at least one protrusion for urging against the inverted braided shield section. Thereafter, an electrically conductive adhesive is applied to the retainer section and/or to the everted braided shield section of the cable end and the cable end is inserted in the housing with the everted braided shield section being placed in the retainer section and abutting against the protrusion. Finally, the housing is closed.

According to the above method an electrical junction box can be manufactured with a reduced number of parts, less labor time at reduced cost. Nevertheless, the necessary requirements of a robust construction, mechanical and EMC protection as well as water tightness are completely fulfilled.

According to the above method a braided shield of the cable end which has been everted to partially surround an isolating jacket of the cable end is not provided with a conductive ferrule to provide an electrical contact between the braided shield and a bus bar or a housing. Rather, the braided shield section of the cable end is inserted in a retainer section of the housing, said retainer section having means for electrically contacting and simultaneously fixing the cable end in the form of at least one protrusion which urges against the everted braided shield section after mounting. To further improve the water tightness, the fixation and an electrical conductance between the housing and the braided shield, an electrically conductive adhesive is applied in the gap between the retainer section and the everted braided shield. As a result, the cable end is fixedly secured in the housing after the housing has been closed and the adhesive has cured, without any further measures or parts being necessary.

In the above method an annular sealing ring may be placed over the isolating jacket (preferably before the braided shield is everted) and may be inserted in a receptacle of the housing. This allows for an improved protection against humidity and water.

In the method, two complementary half-shells may be provided to form the hosing or at least part of the housing, wherein each of said half-shells forms part of the retainer section and/or of the receptacle. By providing two half-shells, which have not necessarily to be of the same size, an insertion of the cable end into one of the half-shells is simplified and it is possible to clamp the everted braided shield section of the cable end between the half-shells upon closing the housing.

To improve the clamping effect, a plurality of protrusions can be provided in the retainer section, e.g. on both half-shells, wherein the protrusions can be arranged in a staggered configuration as seen in the axial direction. This avoids a mechanical damage of the cable end but assists in fixedly securing the cable end in the housing.

With the above method it is possible to place the cable end in the retainer section without a ferrule being attached to the braided shield of the cable. Further, no additional components are required to resist against pull-out forces as the protrusion which is integrally provided with the housing and the electrically conductive adhesive are sufficient to secure the cable end in the housing.

In another aspect the present disclosure is directed to an electrical junction box comprising an electrically conductive housing and at least one cable end defining an axial direction wherein an everted braided shield of the cable partially surrounds an isolating jacket of the cable end. The everted braided shield section of the cable end is received in a retainer section of the housing, said retainer section having at least one protrusion urging against the everted braided shield section. Further, an electrically conductive adhesive is provided between the retainer section and the everted braided shield section of the cable end such as to fixedly secure the cable end in the housing wherein the housing and the braided shield are connected in an electrically conductive manner.

BRIEF DESCRIPTION OF THE SEVERAL VIEWS OF THE DRAWING

The present invention will now be described, by way of example with reference to the accompanying drawings, in which:

FIG. 1 is a schematic drawing of an electrical junction box in a dismounted state.

DETAILED DESCRIPTION OF THE INVENTION

FIG. 1 depicts an example of an electrical junction box in the form of a junction box for a Y-splice. However, this is merely an exemplary embodiment and the electrical junction box according to the present disclosure may have various forms and configurations, e.g. an H-splice or other types of junctions.

The junction box depicted in FIG. 1 is designed for accommodating three cable ends A, B and C in an electrically conductive housing comprising two complementary half-shells 10 and 12. Each of the cable ends A, B and C define an axial direction marked with an arrow. Further, each cable end has one or more wires 14, 16 surrounded by a braided shield 18 and an outer isolating jacket 20. The outer isolated jacket 20 is partially removed such that the wires 14 and 16 of the three cable ends can be interconnected and that the braided shield 18 can be everted, i.e. turned inside out, to partially surround the isolating jacket 20 of the cable end. Thereby, an everted braided shield section E is formed.

Before removing the isolating jacket 20 partly from the cable end, an annular end cap 22 and an annular sealing ring 24 are placed over the cable end.

The electrically conductive housing which may be made of metallic material, provides in each half-shell 10 and 12 for each cable end A, B and C a retainer section 26, 28 for accommodating the everted braided shield section E. The retainer sections 26 and 28 are provided with a plurality of protrusions 30, 32 and 34 in the form of semi-ring-shaped webs designed to receive the half outer circumference of the everted braided shield section E. After the everted braided shield section E has been placed in the retainer section and both half-shells 10 and 12 have been closed, each protrusion urges against the everted braided shield 18 to electrically and mechanically interconnect the housing and the braided shield 18.

To improve the electrical conduction, the sealing capability and the fixation of the cable end in the housing, an electrically conductive adhesive 40 end which is indicated in FIG. 1 as a hatched area is provided between the retainer section 26, 28 and the everted braided shield section E of each cable. It is noted that the electrically conductive adhesive 40 may be applied to the everted braided shield section E and/or to one or both retainer sections 26, 28 of the half-shells.

For accommodating the sealing ring 24 both half-shells 10 and 12 comprise a receptacle 36 which is shaped to receive the elastic sealing ring 24 in a slightly compressed condition.

An electrical junction box as disclosed may be manufactured as follows:

First, each cable end A, B and C is inserted into the end cap 22 and the sealing ring 24. Thereafter, each cable end is dismantled to expose the wires 14 and 16 and the braided shield 18. The braided shield 18 is cut and thereafter everted such that the braided shield 18 partially surrounds the isolating jacket 20 of each cable end to form the everted braided shield section E. The wires 14 and 16 of each cable end are then interconnected using isolated connectors in a known manner. Thereafter, a configuration as shown in FIG. 1 is provided.

For securely and sealingly fixing each cable end the electrically conductive adhesive 40 is then applied to the everted braided shield section E and/or the retainer section 26, 28 of the housing. Thereafter, each cable end A, B and C is put into one of the half-shells with the everted braided shield section E being placed in a retainer section and the sealing ring 24 being placed in the receptacle 36. In a next step both half-shells 10 and 12 are closed, optionally sealed and fixed by well-known. After the adhesive has cured and the housing has been closed each cable end is securely accommodated in the housing wherein the protrusions press against the braided shield 18 to secure the cable end in the housing and to electrically interconnect the housing and the braided shield 18. Finally, each end cap 22 is fit on the housing and interconnected with the housing, e.g. by means of a snap-on connection.

It should be noted that the protrusions 30, 32 and 34 each extend around the cable end over 180° such that after mounting an electrical connection between the housing and the braided shield 18 is provided which extends around the entire circumference of the cable end. This provides improved shielding properties with reduced parts and cost.

The invention claimed is:

1. An electrical junction box, comprising:
an electrically conductive housing;
a plurality of cables, each having a cable end defining an axial direction, wherein an everted braided shield section of each cable end partially surrounds an isolating jacket of each cable end, wherein the everted braided shield sections are in direct contact with retainer sections of the housing such that the everted braided shield section of each cable end is connected through the housing in an electrically conductive manner and wherein each retainer section has a plurality of semicircular half-ring-shaped protrusions abutting against the everted braided shield sections to electrically and mechanically interconnect the housing and the everted braided shield sections; and
an electrically conductive adhesive provided between the retainer section and the everted braided shield sections such that the cable ends are fixedly secured in the housing.

2. The junction box in accordance with claim 1, wherein an annular sealing ring placed over the isolating jacket of each cable end is received in a receptacle of the housing.

3. The junction box in accordance with claim 1, wherein the housing comprises two complementary half-shells, wherein each of the half-shells form part of the retainer section and define at least one of the plurality of semicircular half-ring-shaped protrusions.

4. The junction box in accordance with claim 3, wherein the everted braided shield section is clamped between the half-shells.

5. The junction box in accordance with claim 4, wherein one protrusion in the plurality of plurality of semicircular half-ring-shaped protrusions defined by one of the half-shells is axially offset from two protrusions in the plurality of plurality of semicircular half-ring-shaped protrusions defined by the other half-shell.

6. The junction box in accordance with claim 5, wherein the one protrusion is disposed between the two protrusions.

7. The junction box in accordance with claim 1, wherein the everted braided shield section is clamped between plurality of plurality of semicircular half-ring-shaped protrusions and wherein the plurality of semicircular half-ring-shaped protrusions are staggered in the axial direction.

8. The junction box in accordance with claim 1, wherein the everted braided shield section is placed in the retainer section without a ferrule being provided on the braided shield.

9. The junction box in accordance with claim 1, wherein the plurality of semicircular half-ring-shaped protrusions is in the form of a plurality of semicircular ring-shaped webs.

10. The junction box in accordance with claim 1, wherein the plurality of plurality of semicircular half-ring-shaped protrusions urges against the everted braided shield section.

* * * * *

UNITED STATES PATENT AND TRADEMARK OFFICE
CERTIFICATE OF CORRECTION

| | | |
|---|---|---|
| PATENT NO. | : 11,984,692 B2 | Page 1 of 1 |
| APPLICATION NO. | : 17/949572 | |
| DATED | : May 14, 2024 | |
| INVENTOR(S) | : Olaf Patz et al. | |

It is certified that error appears in the above-identified patent and that said Letters Patent is hereby corrected as shown below:

On the Title Page

(71) Applicant should read "Aptiv Technologies (2) S.à r.l. Luxembourg (LU)".

Signed and Sealed this
Third Day of June, 2025

Coke Morgan Stewart
*Acting Director of the United States Patent and Trademark Office*